US005993929A

United States Patent [19]

Bizer et al.

[11] Patent Number: 5,993,929

[45] Date of Patent: Nov. 30, 1999

[54] CARBON FIBER REINFORCED SEPARATING LAMINATE

[75] Inventors: Dietrich Bizer, Salem; Wolfgang Pritzer, Daisendorf, both of Germany

[73] Assignee: Dornier GmbH, Germany

[21] Appl. No.: 08/889,012

[22] Filed: Jul. 7, 1997

[30] Foreign Application Priority Data

Jul. 4, 1996 [DE] Germany .......................... 196 26 921

[51] Int. Cl.[6] ............................ B32B 5/12; B32B 5/28; B32B 5/26

[52] U.S. Cl. ............................ 428/43; 428/105; 428/113

[58] Field of Search ............................ 428/43, 105, 107, 428/109, 110, 112, 113, 114

[56] References Cited

U.S. PATENT DOCUMENTS 5,567,535 10/1996 Pettit .................................... 428/608

FOREIGN PATENT DOCUMENTS 0 672 517 A1 9/1995 European Pat. Off. .
30 04 905 A1 8/1981 Germany .
195 34 627 A1 3/1997 Germany .
2 249 050 4/1992 United Kingdom .

*Primary Examiner*—Alexander Thomas
*Attorney, Agent, or Firm*—Evenson, McKeown, Edwards & Lenahan, P.L.L.C.

[57] ABSTRACT

A carbon fiber reinforced plastic laminate is scored in the vicinity of a desired breaking area. The laminate is made from multiple layers, each of which is scored. The scores of adjacent layers of the laminate structure are staggered so that each is offset laterally from the adjacent scores.

6 Claims, 4 Drawing Sheets

9
1
2
3
4
5
6
7
8
SCORED AREAS
OVERLAP

OVERLAP=0.4mm
8 LAYERS AT 0.125mm EACH

CARBON FIBER REINFORCED SEPARATING LAMINATE

BACKGROUND AND SUMMARY OF THE INVENTION

The invention relates to a carbon fiber reinforced plastic (CFRP) laminate structure which is scored to provide a predetermined breaking area.

Structural parts of spacecraft transport systems are frequently separated by pyrotechnic separating systems; that is, systems in which spent or otherwise undesired parts are separated and/or jettisoned by means of an explosion. For reasons of weight and cost, it is advantageous to manufacture such separating systems using a CFRP design instead of the previous aluminum design.

One object of the invention is to provide a sufficiently supporting CFRP laminate that breaks at a predetermined breaking line.

Another object of the invention is to provide a CFRP laminate structure that has an exactly predeterminable and testable breaking behavior.

Finally, still another object of the invention is to provide a CFRP structure in which a break occurs without loose particles resulting.

These and other objects and advantages are achieved by the separating laminate according to the invention, which is built up from several CFRP prepreg layers, each of which is scored or slit at a desired separation line or locus. The layers are arranged in such fashion that the score in each layer is separated from that of the adjacent layers. That is scores are staggered with respect to one another, so that an overlap of a certain length results from one layer to the next. The separating laminate can be built up from several unidirectional or multidirectional CFRP prepreg layers.

Other objects, advantages and novel features of the present invention will become apparent from the following detailed description of the invention when considered in conjunction with the accompanying drawings.

DETAILED DESCRIPTION OF THE DRAWINGS

Figure 1:
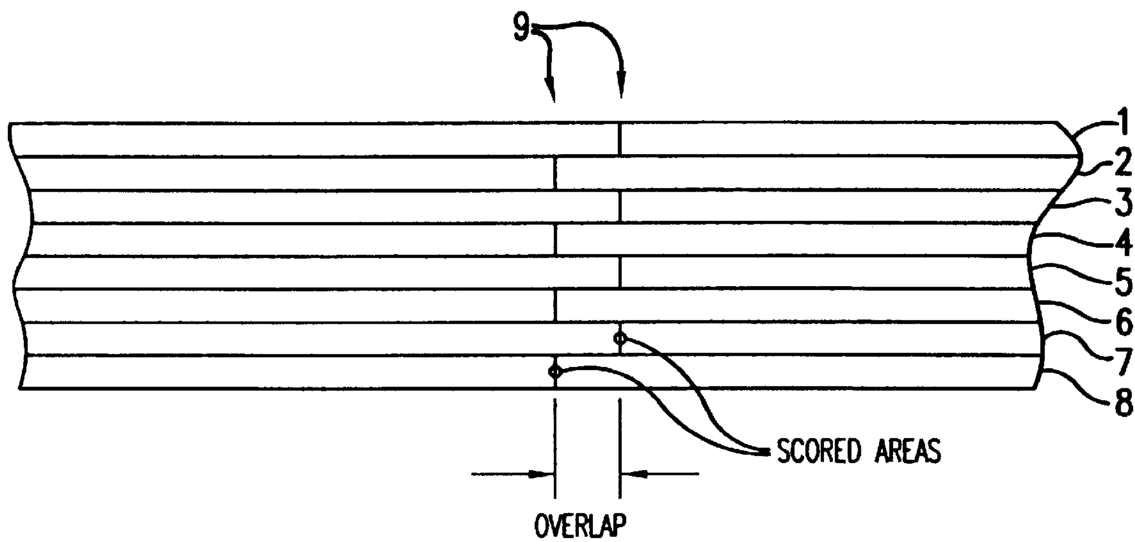
FIG. 1 is a schematic side view of a separating laminate according to the invention.
Figure 2:
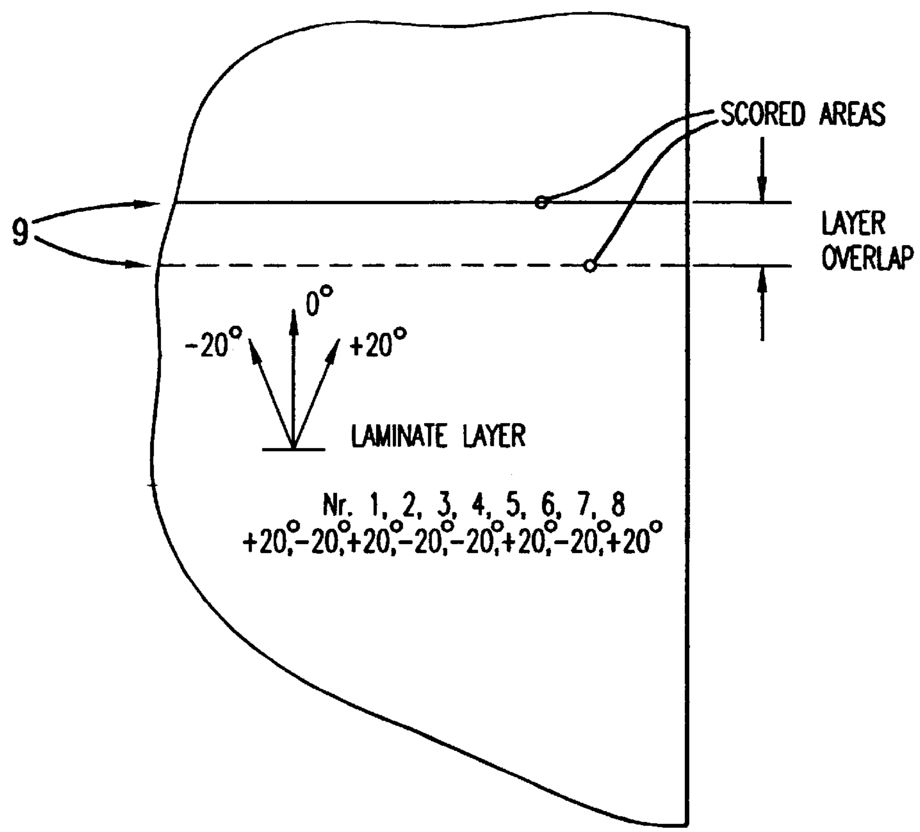
FIG. 2 is a schematic top view of the separating laminate according to the invention.

FIGS. 1 and 2 are schematic side and top views respectively of a CFRP laminate structure according to the invention. FIG. 1 shows such a laminate having eight layers 1–8, each of which is scored at a point 9. The respective layers are staggered so that the scored areas of adjacent layers are offset or separated from each other (layer overlap) as shown in FIGS. 1 and 2.

Each layer of the laminate structure comprises two prepreg parts which are butted against each other to form the score. Because of the staggering of the scores in the respective layers as shown in FIGS. 1 and 2, the prepreg layers have an overlap with the adjacent layers, and the structure thus formed is held together by the resin which bonds the laminated layers together.

A specific example of such a structure is as follows:

eight layers of CFRP unidirectional prepreg (each layer made from initially uncured carbon fibers which are saturated with synthetic resin and arranged parallel to one another);

layer thickness: 0.125 mm (laminate thickness=1.0 mm);

material: HTA/VICOTEX 6376 (commercially available from Ciba-Geigy AG);

layer orientation: alternate layers at ±20°, as shown in FIG. 2; and layer overlap: 0.4 mm.

Figure 3:
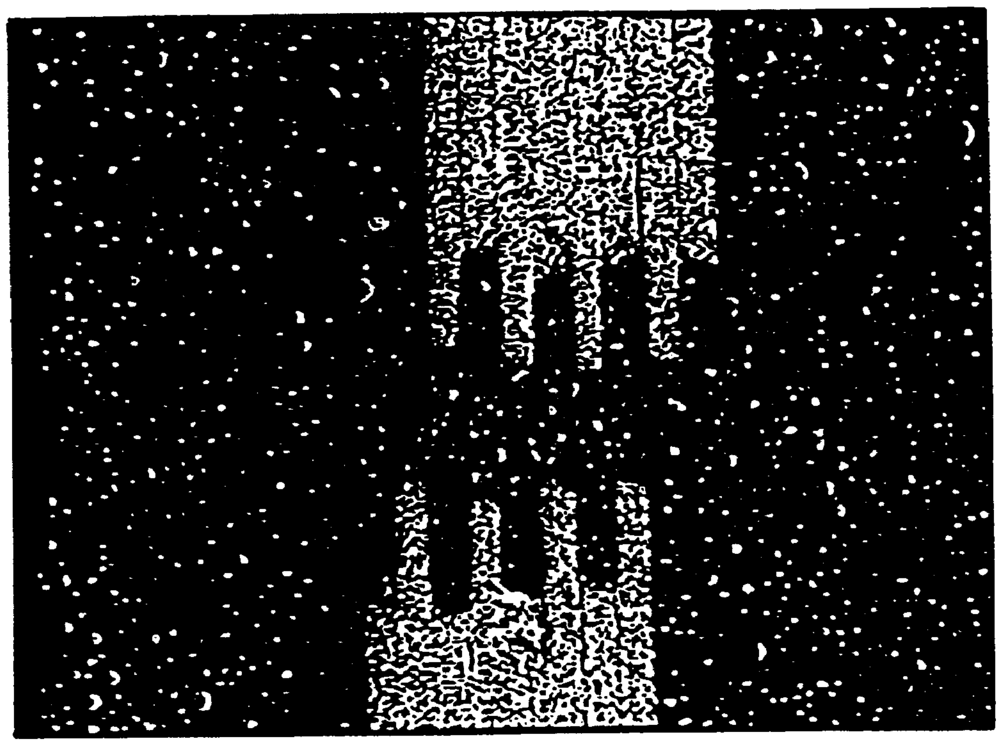
FIG. 3 is a cross section through a separating laminate parted by a tensile test.

FIG. 3 shows the laminate structure of FIGS. 1 and 2 (magnified 30 times) after it has been subjected to a tensile strength test. As can be seen, each of the respective layers has been broken apart at its respective scored area in response to the application of a tensile stress, thereby effecting a separation of the two halves at the desired location. It is thus apparent that the structure according to the invention is suitable for use in pyrotechnic separation systems in which respective parts are separated by the application of tensile forces.

On the other hand, due to the staggering of the scored areas of the adjacent layers as shown in FIGS. 1 and 2 the CFRP laminate structure according to the invention retains sufficient shear strength and side impact resistance to be useful for the manufacture of separable spacecraft parts.

An embodiment of the invention having the parameters described above was tested in a tensile test according to German DIN Standard 29971 (relating to air and space travel, Technical Delivery Condition for Unidirectionally Laid Prepregs Made of Carbon Fibers and Epoxy Resin). In this test, the tensile strength of a separating laminate is determined at room temperature, and the breaking behavior is studied in conjunction with particle emissions. Six test bodies were used, and the result of the tensile test was as follows:

Breaking strength under tension: 242 N/mm$^2$ (Newton's per square millimeter) average;

Breaking behavior: a smooth break occurred at the points where the layers joined and at the overlapping bridges without loose particles resulting.

In a compression test according to DIN 29971, the breaking strength in a compression test was determined on a separating laminate of the same quality, but with twice the thickness. The results of the compression test on 6 test bodies were as follows:

Breaking strength under compression: 442 N/mm$^2$ average.

Figure 4A:
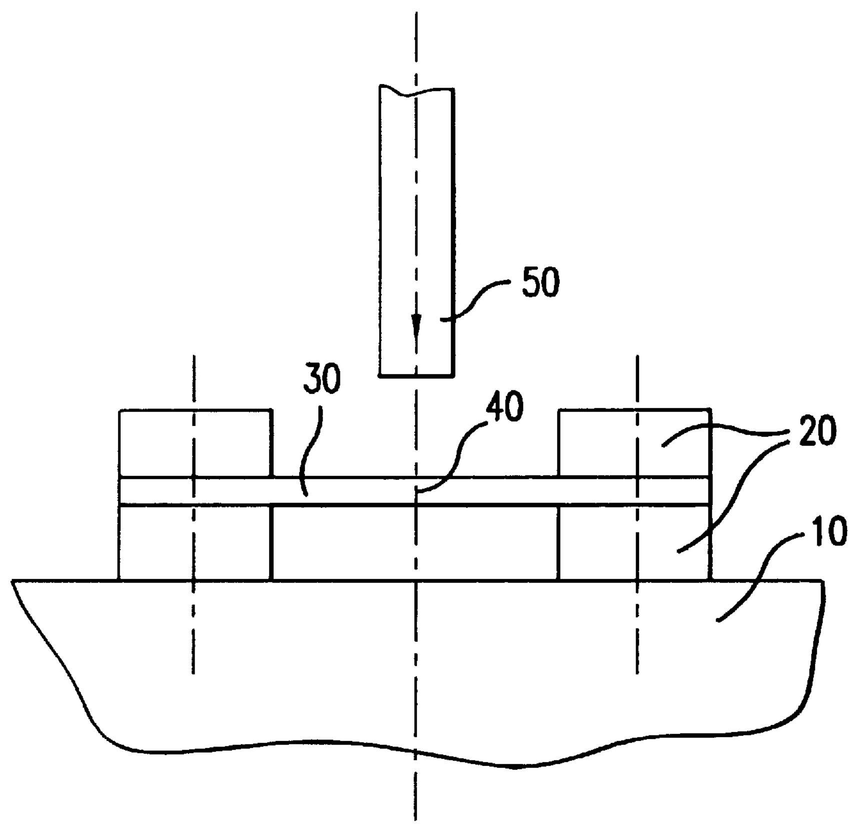
FIGS. 4*a* and 4*b* are schematic top and side views of the test setup for a breaking test with a transverse impact.
Figure 4B:
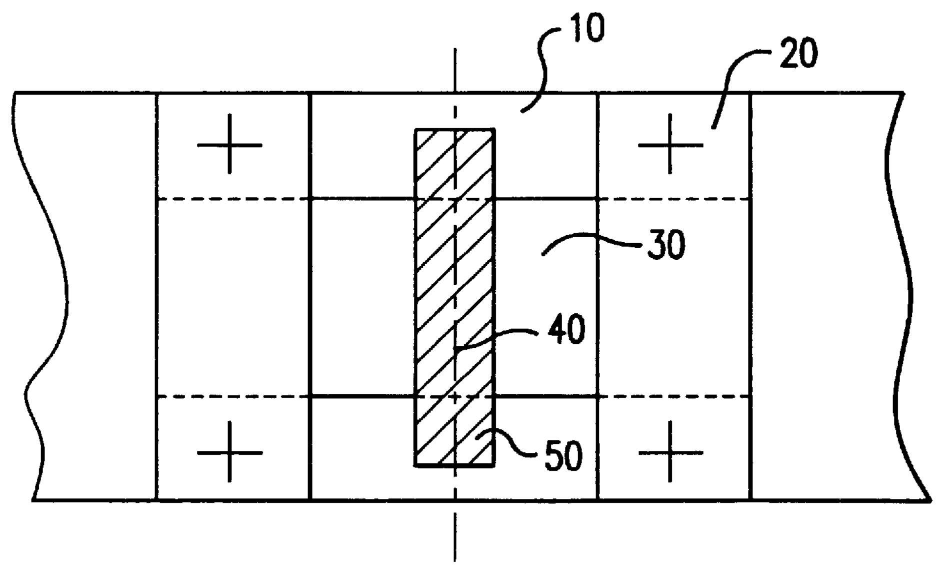

To simulate stress on a separating laminate during pyrotechnic separation, separating laminates were clamped on both sides and stressed at the separating point by the impact of a falling weight. FIGS. 4*a* and *b* show a schematic view of the experimental setup, in which a falling weight impacts the test body (separating laminate) 30 in the vicinity of the scored area 40. For this purpose, the test body is suspended between clamping units 20, which are supported on a surface 10. The test results were as follows:

The tested laminates of the type described above separated at the score. A smooth break occurred as in the tensile test, without any loose particles resulting.

Figure 5A:
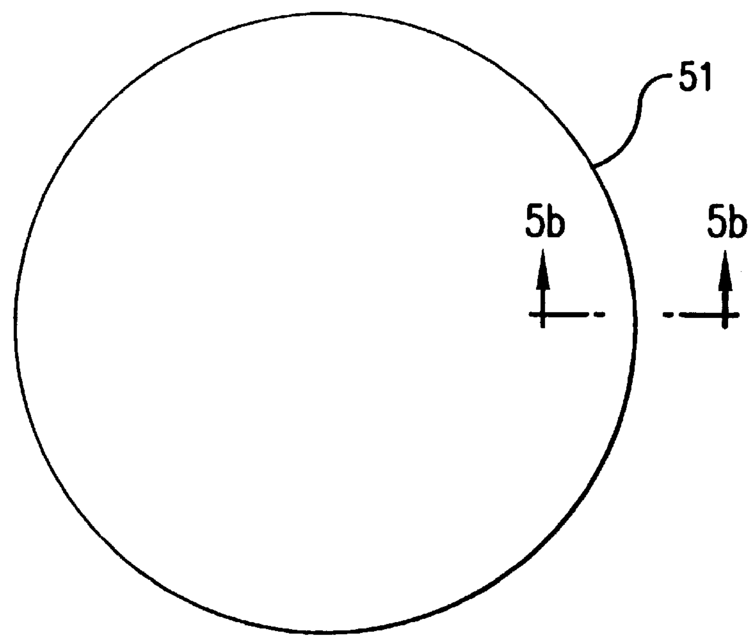
FIGS. 5*a* and 5*b* are schematic depictions of a separation system which incorporates the CFRP laminate structure according to the invention.
Figure 5B:
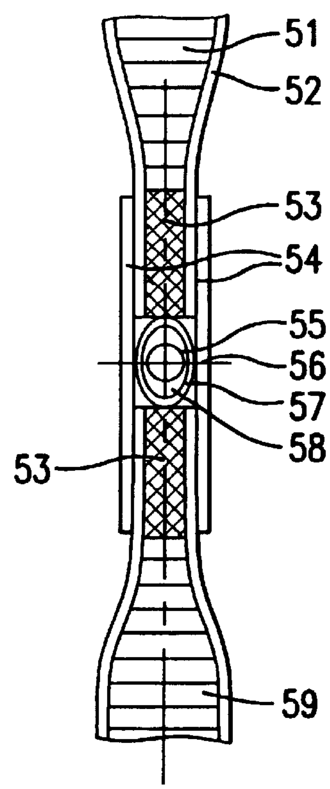

FIGS. 5*a* and 5*b* illustrate an example of a separation system which includes the CFRP laminate structure according to the invention. FIG. 5*a* is a schematic cross sectional depiction of a circular element of a spacecraft which is designed to separate along a separation ring 51, while FIG. 5*b* is a longitudinal cross section of a wall of the structure in FIG. 5*a*, taken along line VB—VB. As shown in FIG. 5*b*, a pyrochord 55 is arranged together with a filling material 58, in a small oval gas tight steel tube 57, which follows the separation line 56 along the separation ring 51. CFRP laminate members 53 having CFRP face sheets 52 butt up against each side of the steel tube 57. The area of this butt joint is covered and held in position by the separating CFRP laminate structure according to the invention, with the separation line 56 following the separation ring 51.

In order to separate the upper and lower portions of the separation system, the pyro chord 55 is detonated, which causes the steel tube 57 to expand to a circular cross sectional configuration, which exceeds the thickness of the separation member. This breaks the separating laminate (arranged on both sides of the tube) along the breaking line.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fiber reinforced laminate material having a predetermined breaking area, comprising:

a plurality of carbon fiber reinforced prepreg layers which are sandwiched together and jointly cured to form a laminate material; wherein
each of said layers has a scored area; and
scored areas of each of said layers are arranged in proximity to said breaking area of said laminate material, with the location of scored areas being staggered so that scored areas of adjacent layers are laterally offset relative to one another, and so that scored areas of alternate layers are aligned alternately at first and second edges of said braking area.

2. A carbon fiber reinforced laminate material having a predetermined breaking area according to claim 1, wherein said carbon fiber reinforced laminate material forms a structural part of a spacecraft.

3. A carbon fiber reinforced laminate material having a predetermined breaking area according to claim 1, wherein said breaking area is a pyrotechnic separation area.

4. A carbon fiber reinforced laminate material having a predetermined breaking area according to claim 1, wherein carbon fibers of adjacent layers of said carbon fiber reinforced laminate material area rotated by ±20° relative to each other.

5. A method of manufacturing a fiber reinforced laminate material having a predetermined breaking area, said method comprising:

arranging a plurality of carbon fiber reinforced prepreg layers in a stack to form a sandwich jointly cured to form a laminate material; wherein
each of said layers has a scored area; and
scored areas of each of said layers are aligned in proximity to said breaking area of said laminate material, with the location of scored areas being staggered so that scored areas of adjacent layers are laterally offset relative to one another, and so that scored areas of alternate layers are aligned alternately at first and second edges of said braking area; and
jointly curing said layers to form a laminate material.

6. A separation joint for defining a predetermined separation area in a fiber reinforced laminate material, comprising a plurality of interdigitated layers of fibrous material which are laminated together, each of said layers having a scored area, with the location of scored areas being staggered so that scored areas of adjacent layers are laterally offset relative to one another, and so that scored areas of alternate layers are aligned alternately at first and second edges of said separation area.

* * * * *